United States Patent
Satou et al.

(10) Patent No.: US 10,371,809 B2
(45) Date of Patent: Aug. 6, 2019

(54) ON-BOARD RADAR APPARATUS AND NOTIFICATION SYSTEM

(71) Applicant: DENSO CORPORATION, Kariya, Aichi-pref. (JP)

(72) Inventors: Miki Satou, Kariya (JP); Yasuyuki Miyake, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 359 days.

(21) Appl. No.: 15/325,839

(22) PCT Filed: Jul. 13, 2015

(86) PCT No.: PCT/JP2015/070022
§ 371 (c)(1),
(2) Date: Jan. 12, 2017

(87) PCT Pub. No.: WO2016/009987
PCT Pub. Date: Jan. 21, 2016

(65) Prior Publication Data
US 2017/0160391 A1    Jun. 8, 2017

(30) Foreign Application Priority Data

Jul. 16, 2014    (JP) ................. 2014-145979

(51) Int. Cl.
*G01S 7/41* (2006.01)
*G01S 13/34* (2006.01)
(Continued)

(52) U.S. Cl.
CPC ............ *G01S 13/536* (2013.01); *G01S 7/415* (2013.01); *G01S 13/347* (2013.01); *G01S 13/38* (2013.01);
(Continued)

(58) Field of Classification Search
CPC ................. G01S 13/931; G01S 13/584; G01S 2013/9378; G01S 2013/9332;
(Continued)

(56) References Cited

U.S. PATENT DOCUMENTS

2008/0012752 A1* 1/2008 Okamura ............. G01S 7/4026
342/165
2008/0186224 A1* 8/2008 Ichiyanagi ........... G01S 13/347
342/109
(Continued)

FOREIGN PATENT DOCUMENTS

JP    2008082974 A    4/2008
JP    2010038706 A    2/2010
(Continued)

*Primary Examiner* — Olumide Ajibade Akonai
(74) *Attorney, Agent, or Firm* — Knobbe, Martens, Olson & Bear, LLP

(57) ABSTRACT

A radar apparatus is attached to a vehicle such that a direction at 90 degrees relative to a front-rear direction of the vehicle is included in a detection range, and transmits and receives radar waves. The radar apparatus detects an observation point relative speed that is a relative speed in relation to an observation point that has reflected the radar wave within the detection range and an observation point azimuth that is an azimuth at which the observation point is present. The radar apparatus determines that a moving object is detected when an expression expressed by $V<Vs\cdot\sin((\theta-\varphi))$ is satisfied, where $\varphi$ is an attachment angle that is an angle at which a center axis of a reception antenna receiving the radar wave is angled in relation to a width direction of the vehicle, $V$ is the observation point relative speed, $\theta$ is the observation point azimuth, and $Vs$ is a traveling speed of the vehicle.

11 Claims, 7 Drawing Sheets

(51) Int. Cl.
*G01S 13/38* (2006.01)
*G01S 13/42* (2006.01)
*G01S 13/58* (2006.01)
*G01S 13/60* (2006.01)
*G01S 13/93* (2006.01)
*G01S 13/536* (2006.01)

(52) U.S. Cl.
CPC ............ *G01S 13/42* (2013.01); *G01S 13/584* (2013.01); *G01S 13/589* (2013.01); *G01S 13/60* (2013.01); *G01S 13/93* (2013.01); *G01S 13/931* (2013.01); *G01S 2013/9378* (2013.01); *G01S 2013/9385* (2013.01)

(58) Field of Classification Search
CPC ........... G01S 2013/9375; G01S 13/347; G01S 2013/9385; G01S 13/04; G01S 13/10; G01S 13/582; G01S 13/589; G01S 13/93
See application file for complete search history.

(56) References Cited

U.S. PATENT DOCUMENTS

| | | |
|---|---|---|
| 2009/0009381 A1 | 1/2009 | Inaba |
| 2009/0015462 A1* | 1/2009 | Nakanishi ............ G01S 13/931 342/107 |
| 2009/0085796 A1* | 4/2009 | Kuroda ................... G01S 7/354 342/129 |
| 2009/0102698 A1 | 4/2009 | Ichiyanagi et al. |
| 2012/0194377 A1* | 8/2012 | Yukumatsu ........... G01S 13/931 342/70 |
| 2012/0242531 A1 | 9/2012 | Itoh |
| 2014/0085127 A1* | 3/2014 | Kishigami ............. G01S 13/91 342/108 |
| 2016/0011299 A1* | 1/2016 | Satou ..................... G01S 13/34 342/70 |

FOREIGN PATENT DOCUMENTS

| | | |
|---|---|---|
| JP | 2010043960 A | 2/2010 |
| JP | 2011047694 A | 3/2011 |
| WO | WO 2006/013614 | 5/2008 |

* cited by examiner

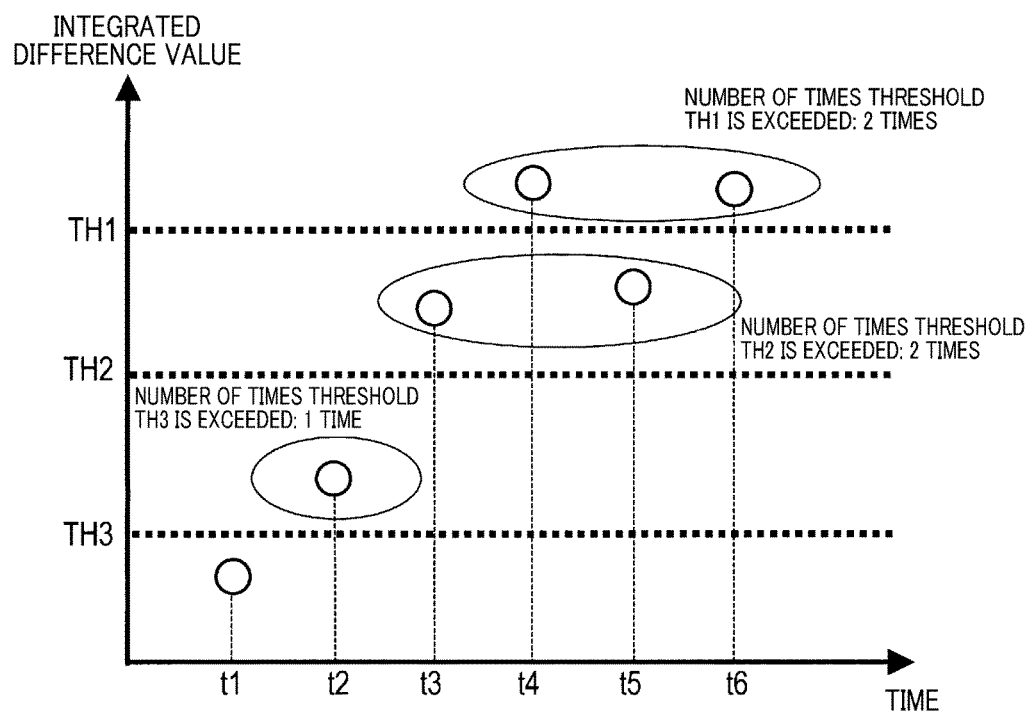

ON-BOARD RADAR APPARATUS AND NOTIFICATION SYSTEM

CROSS-REFERENCE TO RELATED APPLICATION

This application is a U.S. National Phase Application under 35 U.S.C. 371 of International Application No. PCT/JP2015/070022 filed on Jul. 13, 2015 and published in Japanese as WO 2016/009987 A1 on Jan. 21, 2016. This application is based on and claims the benefit of priority from Japanese Patent Application No. 2014-145979, filed Jul. 16, 2014. The entire disclosures of all of the above applications are incorporated herein by reference.

TECHNICAL FIELD

The present invention relates to an on-board radar apparatus that detects an object present in the vicinity of a vehicle and a notification system.

BACKGROUND ART

Conventionally, an on-board radar apparatus that detects an object in the vicinity of a vehicle by irradiating radar waves as transmission waves over a predetermined angle in the vicinity of the vehicle and receiving reflected waves is known (for example, refer to PTL 1).

The radar apparatus detects a speed component in a direction towards an antenna surface. Therefore, when an object positioned directly next to an own vehicle is detected, the on-board radar apparatus determines that a relative speed of the object is zero. That is, the on-board radar apparatus is unable to determine whether the object positioned directly next to the own vehicle is a stationary object that is stationary or a moving object that is traveling alongside the own vehicle at the same traveling speed.

Therefore, whether an object detected within a detection range of the radar apparatus is a stationary object or a moving object is determined based on a history of the position and relative speed of the detected object. For example, the radar apparatus calculates the relative speed based on an amount of change in the position of the detected object. When the relative speed matches the traveling speed of the own vehicle, the radar apparatus determines that the detected object is a stationary object.

CITATION LIST

Patent Literature

[PTL 1] JP-A-2010-43960

SUMMARY OF INVENTION

Technical Problem

However, to use the history of the position of the detected object, the position of the detected object is required to be detected a plurality of times. A problem occurs in that time is required to determine whether or not the detected object is a stationary object.

The present invention has been achieved in light of such issues. An object of the present invention is to provide a technology that enables determination regarding whether or not a detected object is stationary to be made in a short amount of time.

Solution to Problem

An on-board radar apparatus of the present invention is attached to a vehicle such that a direction at 90° in relation to a front-rear direction of the vehicle is included in a detection range, and transmits and receives radar waves. In addition, the on-board radar apparatus of the present invention includes an observation point detecting means and a moving object detecting means.

The observation point detecting means detects an observation point relative speed that is a relative speed in relation to an observation point that has reflected the radar wave within the detection range and an observation point azimuth that is an azimuth at which the observation point is present.

The moving object detecting means determines that a moving object is detected when an expression (1) is satisfied, the expression (1) being expressed by $$V < Vs \cdot \sin(\theta - \varphi) \tag{1}$$

where $\varphi$ is an attachment angle that is an angle at which a center axis of a reception antenna receiving the radar wave is angled in relation to a width direction of the vehicle, V is the observation point relative speed, $\theta$ is the observation point azimuth, and Vs is a traveling speed of the vehicle.

As a result of the on-board radar apparatus of the present invention configured in this way, whether or not a moving object is detected can be determined based on the above-described expression (1), by the observation point relative speed, the observation point azimuth, and the traveling speed of the vehicle being detected once. Therefore, the on-board radar apparatus of the present invention is no longer required to detect the position of a detected object a plurality of times to determine whether or not the detected object is a stationary object. Consequently, the on-board radar apparatus of the present invention can determine whether or not a detected object is stationary in a short amount of time.

BRIEF DESCRIPTION OF DRAWINGS

In the accompanying drawings:

FIG. 10 is a diagram for explaining a detection method for a traveling vehicle according to another embodiment.

DESCRIPTION OF EMBODIMENTS

An embodiment of the present invention will hereinafter be described with reference to the drawings.

Figure 1:
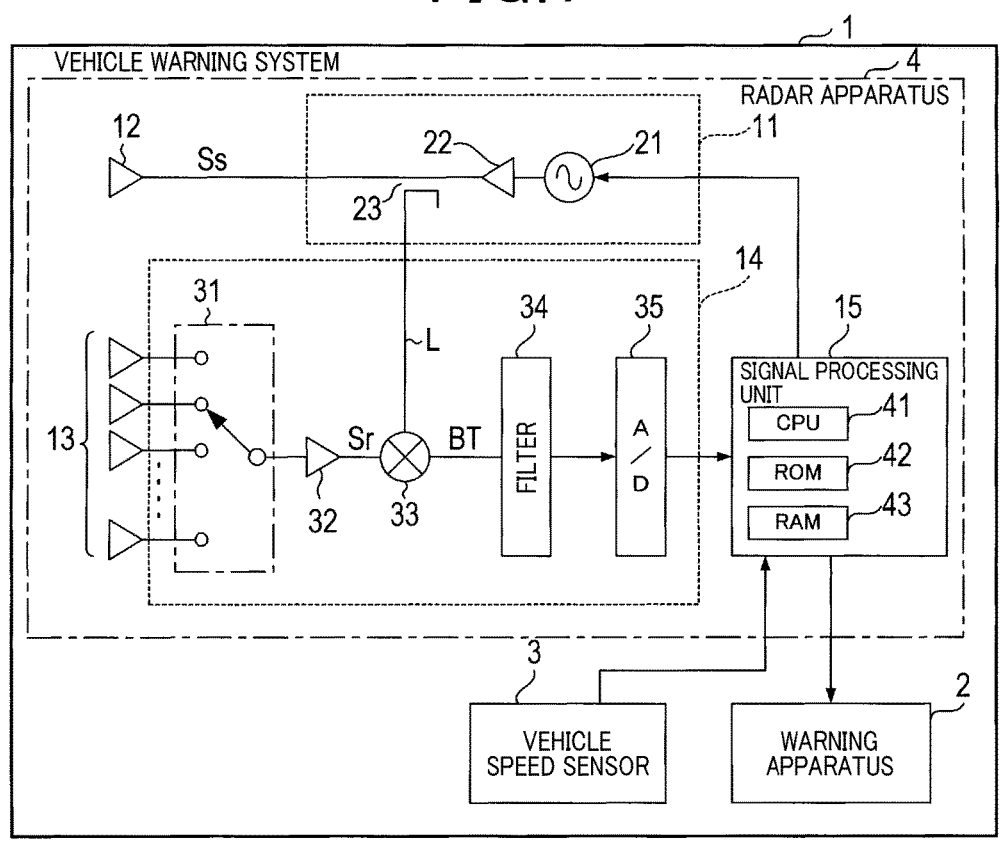
FIG. 1 is a block diagram of a configuration of a vehicle warning system according to an embodiment.

A vehicle warning system 1 according to the present embodiment is mounted in a vehicle. As shown in FIG. 1, the vehicle warning system 1 includes a warning apparatus 2, a vehicle speed sensor 3, and a radar apparatus 4.

The warning apparatus 2 is an audio output apparatus that is set inside a vehicle cabin. The warning apparatus 2 issues a warning to an occupant of the vehicle.

The vehicle speed sensor 3 detects a traveling speed of the vehicle (referred to, hereafter, as an own vehicle) in which the vehicle warning system 1 is mounted.

The radar apparatus 4 uses a known dual-frequency continuous-wave (CW) method. The radar apparatus 4 includes a transmission circuit 11, a transmission antenna 12, a reception antenna 13, a reception circuit 14, and a signal processing unit 15.

The transmission circuit 11 supplies a transmission signal Ss to the transmission antenna 12. The transmission circuit 11 includes an oscillator 21, an amplifier 22, and a distributor 23. The oscillator 21 generates a millimeter-waveband high-frequency signal. The oscillator 21 generates a high-frequency signal having a first frequency f1 and a high-frequency signal having a second frequency f2 in an alternating manner at a short time interval, and outputs the generated high-frequency signals. The second frequency f2 is a slightly different frequency than the first frequency f1. The amplifier 22 amplifies the high-frequency signal outputted from the oscillator 21. The distributor 23 performs power distribution of the output signal of the amplifier 22 to the transmission signal Ss and a local signal L.

The transmission antenna 12 irradiates a radar wave based on the transmission signal Ss supplied from the transmission circuit 11. The radar wave has a frequency that corresponds to the transmission signal Ss. As a result, a radar wave having the first frequency f1 and a radar wave having the second frequency f2 are alternately outputted.

The reception antenna 3 is an array antenna configured such that a plurality of antenna elements are arrayed in a single row.

The reception circuit 14 includes a reception switch 31, an amplifier 32, a mixer 33, a filter 34, and an analog-to-digital (A/D) converter 35.

The reception switch 31 successively selects any one of the plurality of antenna elements configuring the reception antenna 13 and outputs a reception signal Sr from the selected antenna element to the amplifier 32.

The amplifier 22 amplifies the reception signal Sr inputted from the reception switch 31 and outputs the amplified reception signal Sr to the mixer 33.

The mixer 33 mixes the reception signal Sr amplified by the amplifier 32 and the local signal L, and generates a beat signal BT.

The filter 34 removes unnecessary signal components from the beat signal BT generated by the mixer 33.

The A/D converter 35 samples the beat signal BT outputted from the filter 34 and converts the beat signal BT to digital data. The A/D converter 35 then outputs the digital data to the signal processing unit 15.

The signal processing unit 15 is an electronic control unit that is mainly configured by a known microcomputer including a central processing unit (CPU) 41, a read-only memory (ROM) 42, and a random access memory (RAM) 43. The signal processing unit 15 performs signal analysis and controls operation of the radar apparatus 4 as a result of the CPU 41 preforming processes based on programs stored in the ROM 42.

Specifically, the signal processing unit 15 controls the transmission circuit 11 so that radar waves having the first frequency f1 and the radar waves having the second frequency f2 are alternately emitted from the transmission antenna 12 at a modulation cycle Tm. In addition, the signal processing unit 15 enables the beat signal BT of each of the plurality of antenna elements configuring the reception antenna 13 to be sampled in the reception circuit 14. The signal processing unit 15 then measures a distance (referred to, hereafter, as an observation point distance) to a point (referred to, hereafter, as an observation point) at which the radar wave is reflected, a relative speed (referred to, hereafter, as an observation point relative speed) in relation to the observation point, and an azimuth (referred to, hereafter, as an observation point azimuth) at which the observation point is present, by analyzing the sampling data of the beat signals BT.

In the dual-frequency CW method, a first beat signal and a second beat signal are generated as the beat signal BT. The first beat signal is generated by the reception signal Sr having the first frequency f1 and the local signal L having the first frequency f1 being mixed.

In a similar manner, the second beat signal is generated by the reception signal Sr having the second frequency f2 and the local signal L having the second frequency f2 being mixed.

Relationships in following expressions (2) and (3) are established between a frequency fb1 of the first beat signal and a frequency fb2 of the second beat signal, and an observation point relative speed v. In expressions (2) and (3), c is the speed of light.

$$fb1=(2v/c) \times f1 \qquad (2)$$

$$fb2=(2v/c) \times f2 \qquad (3)$$

That is, in the dual-frequency CW method, the observation point relative speed is measured based on the frequency of the generated beat signal.

Furthermore, in the dual-frequency CW method, as is known, the observation point distance is calculated based on a phase difference between the first beat signal and the second beat signal.

Figure 2:
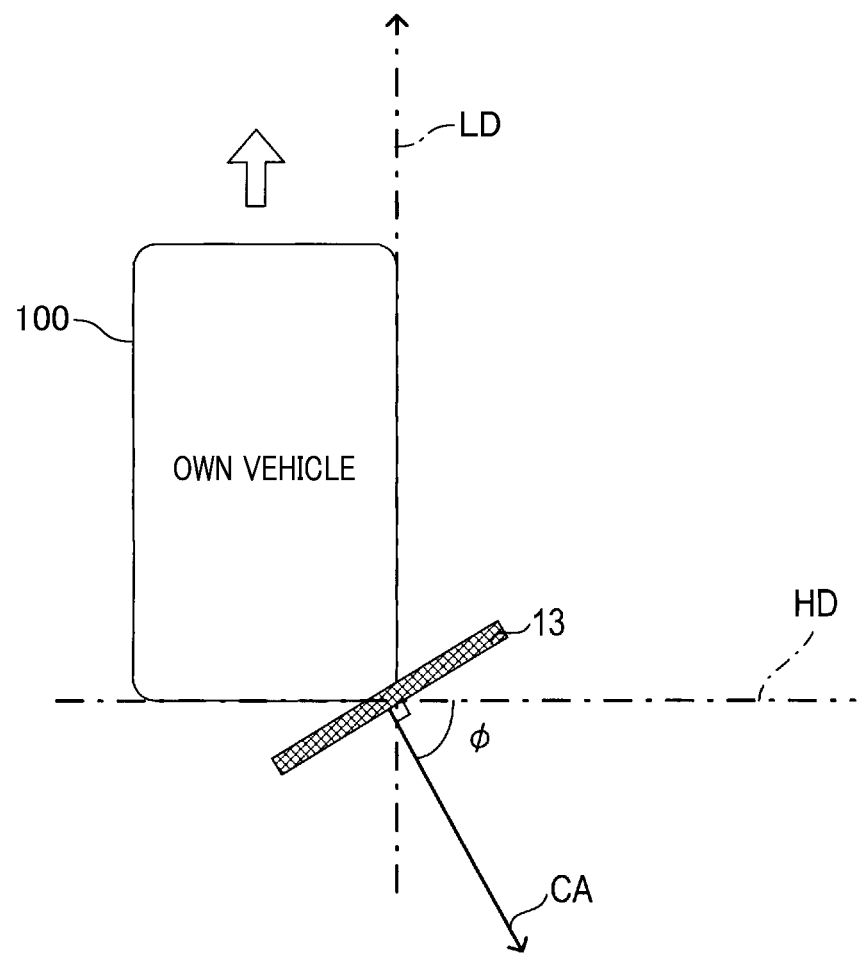
FIG. 2 is an explanatory diagram of an attachment position of a reception antenna shown in FIG. 1.

The reception antenna 13 is provided on each of the left and right ends at the rear of the own vehicle. As shown in FIG. 2, the reception antenna 13 is attached such that a center axis CA of a detection range of the reception antenna 13 faces a direction at an angle in relation to a left/right direction HD of an own vehicle 100 by an attachment angle φ towards the rear (towards the left side regarding the reception antenna 13 positioned on the left side, and towards the right side regarding the reception antenna 13 positioned on the right side). In addition, the detection range is set such as to include a direction at 90° in relation to a front-rear direction LD of the own vehicle 100. In the present example, a reception antenna 13 that covers a range of about ±90° with the center axis CA at the center is used.

In the vehicle warning system 1 configured in this way, the signal processing unit 15 performs a traveling vehicle detection process for detecting a vehicle that is traveling near the own vehicle 100. The traveling vehicle detection process is a process that is performed at every modulation cycle Tm while the signal processing unit 15 is in operation.

First, a detection principle of the traveling vehicle detection process will be described.

Figure 3:
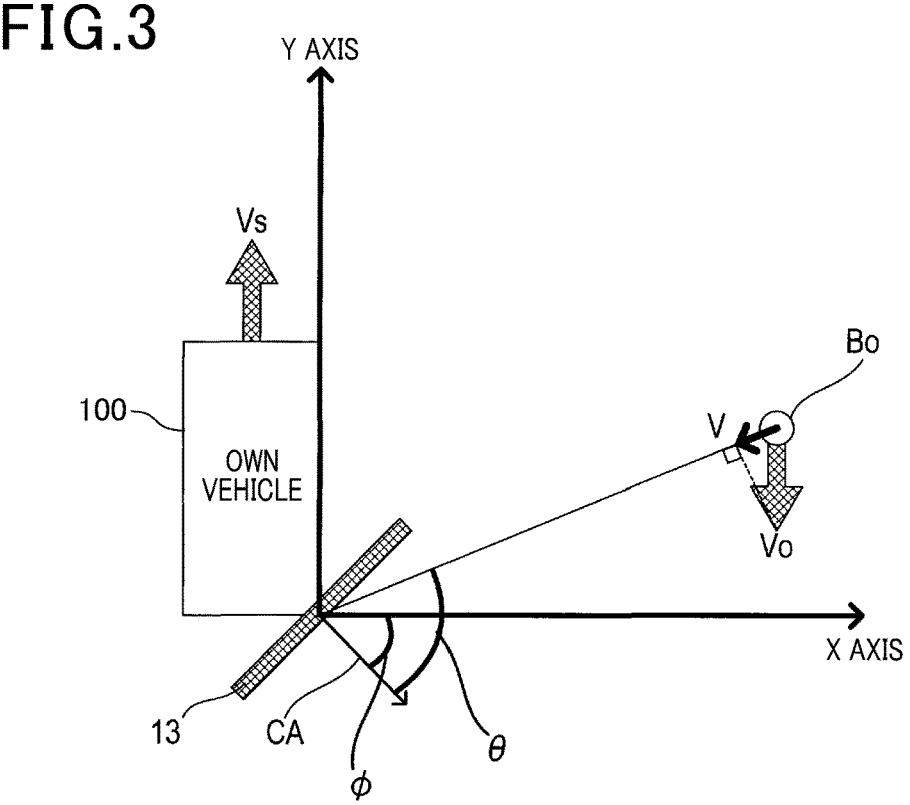
FIG. 3 is a diagram for explaining a detected speed when the reception antenna shown in FIG. 2 detects a stationary object.

As shown in FIG. 3, with the front-rear direction of the own vehicle 100 as a Y axis and the direction perpendicular to the front-rear direction as an X axis, when the own vehicle is traveling at a speed Vs along the Y-axis direction, a relative speed Vo of a stationary object in the Y-axis direction in relation to the own vehicle 100 is expressed by a following expression (4).

$$Vo = -Vs \quad (4)$$

In addition, when the reception antenna 13 is attached such that the center axis CA faces a direction at an angle in relation to the X axis by the attachment angle φ, a detected speed V when the reception antenna 13 detects a stationary object Bo that is present in a direction at an angle in relation to the center axis CA by a detected angle θ is expressed by a following expression (5).

$$V = Vs \cdot \sin((\theta - \varphi)) \quad (5)$$

Figure 4:
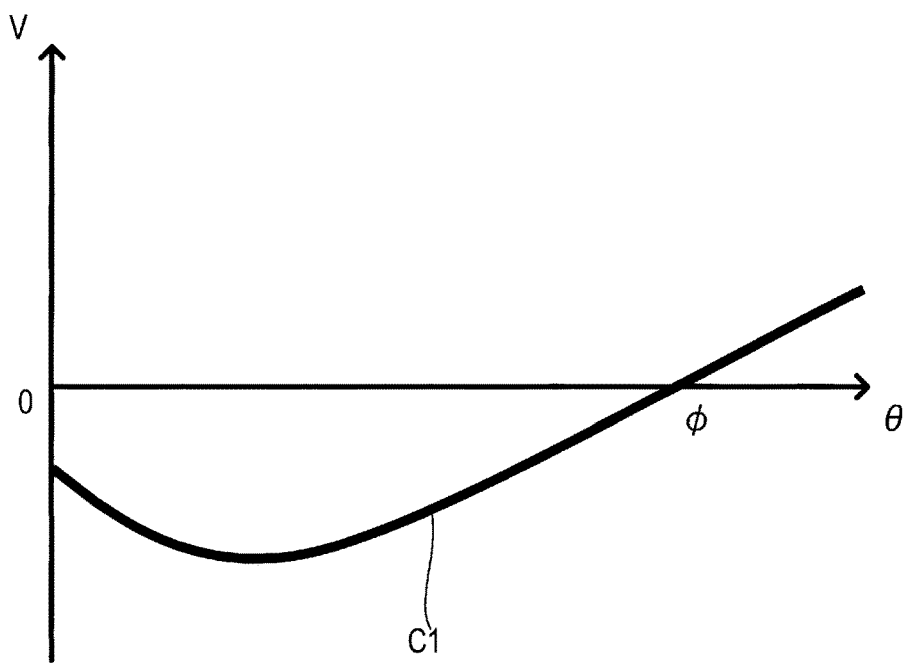
FIG. 4 is a graph of a stationary object speed-azimuth curve.

That is, whereas the detected speed V changes based on the detected angle θ, the detected speed V does not change based on the distance between the reception antenna 13 and the stationary object Bo. In addition, based on expression (5), the detected speed V of the stationary object in relation to the own vehicle is expressed by a curve C1 (referred to, hereafter, as a stationary object speed-azimuth curve C1) on a two-dimensional orthogonal coordinate system (referred to, hereafter, as a θ-V coordinate system) in which a horizontal axis is the detected angle θ and a vertical axis is the detected speed V, as shown in FIG. 4. In the stationary object speed-azimuth curve C1, the detected speed V increases as the detected angle θ increases and becomes zero when the detected angle θ is the attachment angle φ.

Figure 5:
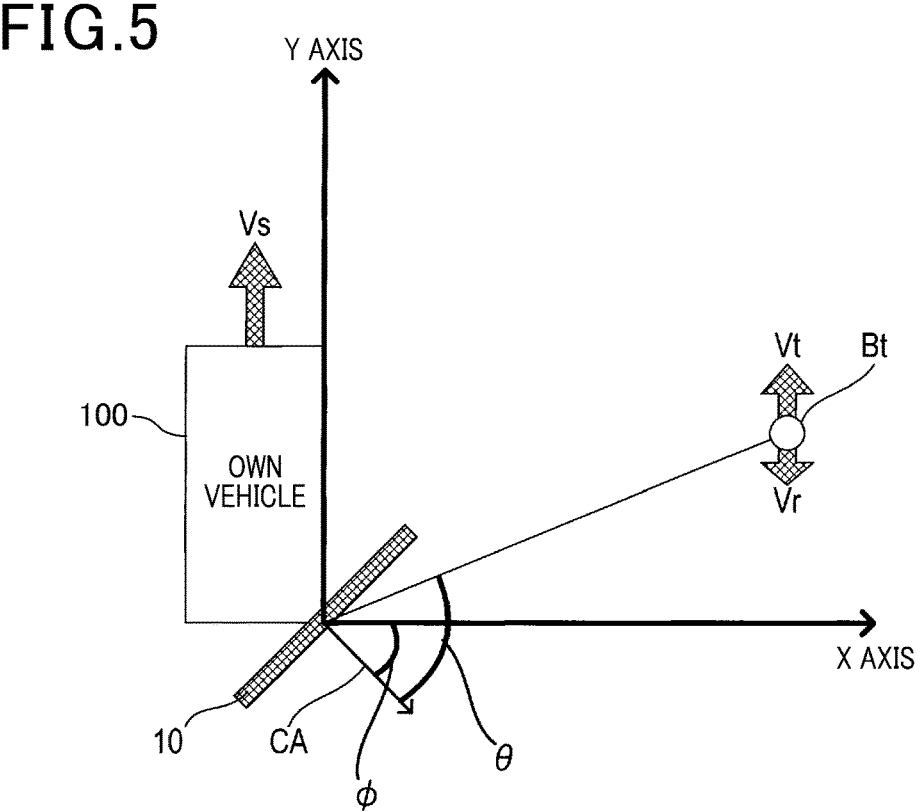
FIG. 5 is a diagram for explaining a relative speed of a parallel-traveling vehicle in a Y-axis direction.

In addition, as shown in FIG. 5, when a parallel-traveling vehicle Bt that is traveling at a speed Vt along the Y-axis direction is present near the own vehicle, a relative speed Vr of the parallel-traveling vehicle Bt in the Y-axis direction is expressed by a following expression (6).

$$Vr = -Vs + Vt \quad (6)$$

That is, the relative speed Vr of the parallel-traveling vehicle Bt in the Y-axis direction is lower than the relative speed Vo of the stationary object in the Y-axis direction.

Figure 6:
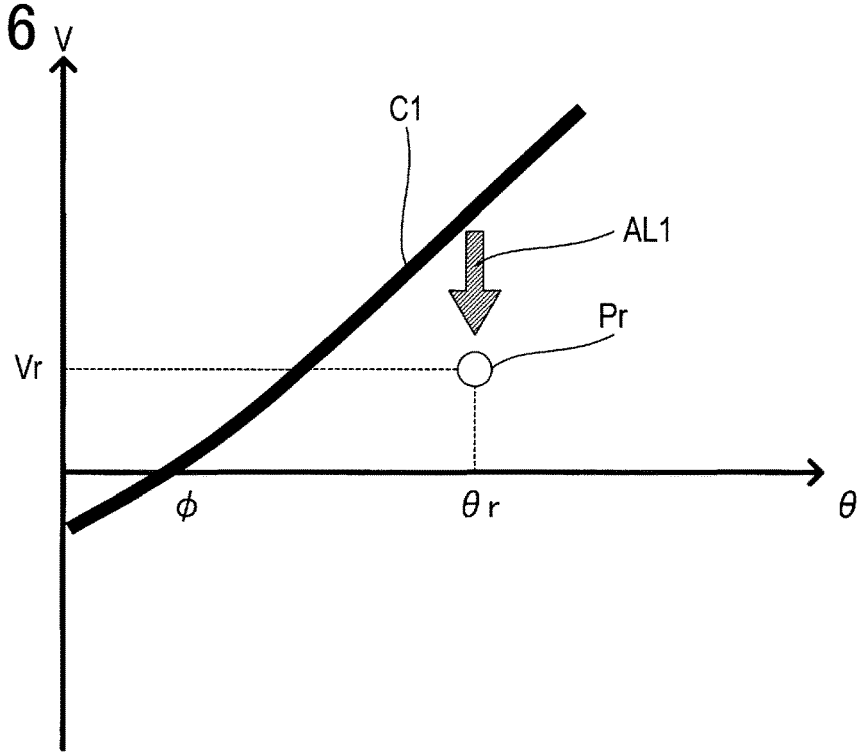
FIG. 6 is a graph of a positional relationship between a coordinate point and the stationary object speed-azimuth curve.

Therefore, as shown in FIG. 6, on the θ-V coordinate system, a coordinate point Pr indicating the relative speed Vr and a detected angle θr of the parallel-traveling vehicle Bt is positioned below the stationary object speed-azimuth curve C1 (see arrow AL1).

Therefore, a vehicle traveling near the own vehicle can be detected based on whether or not a coordinate point indicating the observation point relative speed and the observation point azimuth is positioned below the stationary object speed-azimuth curve C1 on the θ-V coordinate system.

Next, steps in the traveling vehicle detection process will be described.

Figure 7:
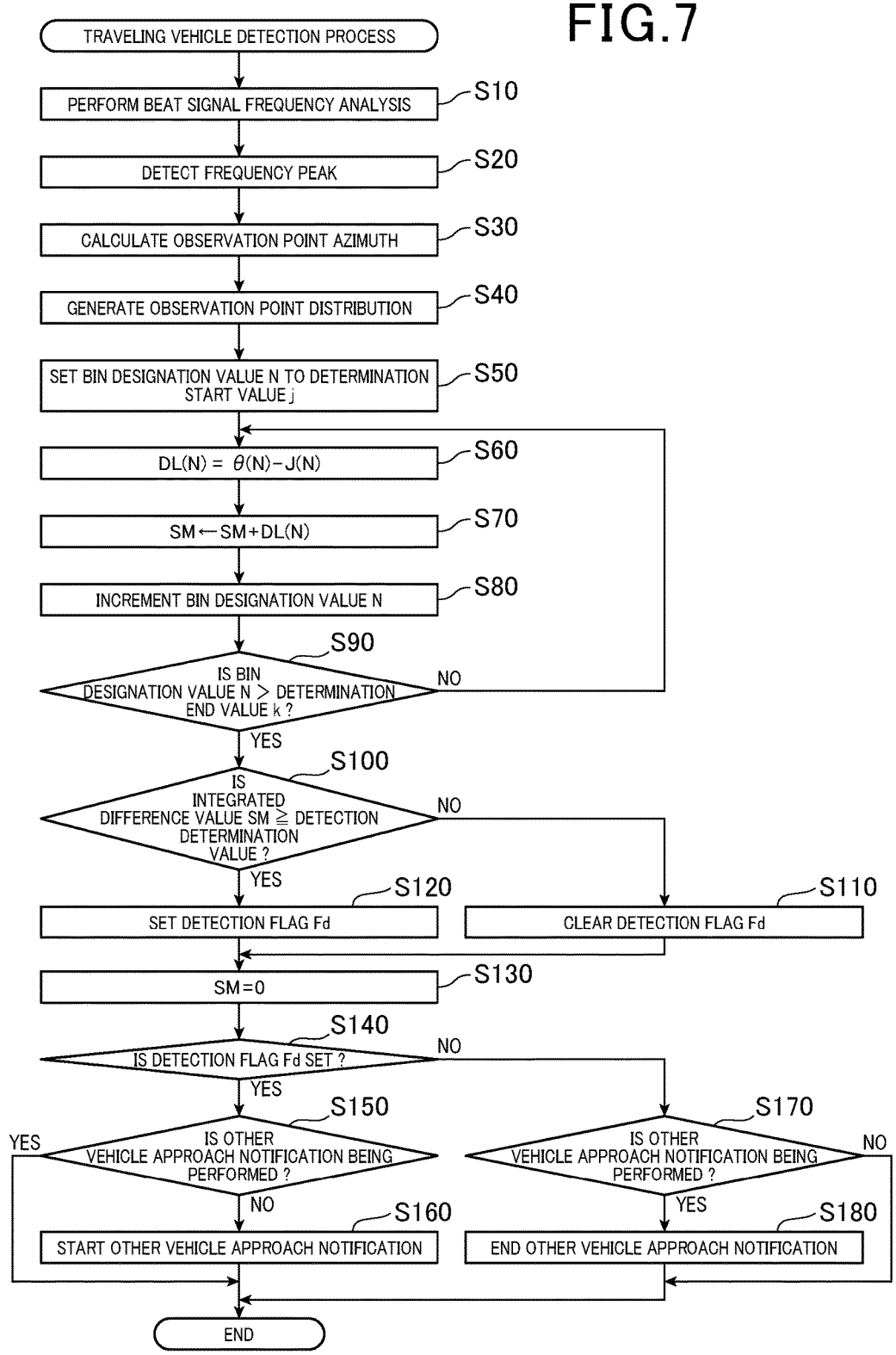
FIG. 7 is a flowchart of a traveling vehicle detection process by a signal processing unit shown in FIG. 1.

When the traveling vehicle detection process is performed, as shown in FIG. 7, first, at step S10, the signal processing unit 15 performs frequency analysis (fast Fourier transform (FFT) according to the present embodiment) of the beat signal inputted from the reception circuit 14 and determines a power spectrum of the beat signal BT. The power spectrum indicates the frequencies of the beat signal and the strength of the beat signal at each frequency.

The beat signal is a real signal. Therefore, when Fourier transform is performed on the beat signal, the frequency spectrum of the beat signal has positive frequency components and negative frequency components of which the absolute values of the frequencies are equal to each other.

At step S10, the signal processing unit 15 detects the phase of the beat signal by performing an in-phase and quadrature (IQ) detection on the beat signal. Based on changes over time in the phase of the beat signal, the signal processing unit 15 detects a rotation direction of the phase of the beat signal on an IQ plane. In addition, at step S10, the signal processing unit 15 uses either of the positive frequency components and the negative frequency components on the frequency spectrum of the beat signal, based on the detected rotation direction. As a result, at step S10, the power spectrum is generated such that the frequencies of the beat signal are positive when the observation point is near the own vehicle and the frequencies of the beat signal are negative when the observation point moves away from the own vehicle.

For each of a plurality of frequency bins FB(0), FB(1), FB(2), ... FB(m) (m being a positive integer) to which differing frequencies are set, the power spectrum indicates the strength of the corresponding frequency. The frequency bins FB(0), FB(1), FB(2), ... FB(m) are provided in order from the smallest frequency.

Then, at step S20, the signal processing unit 15 detects a single or a plurality of frequency peaks fb present on the power spectrum for the beat signal. A single or a plurality of frequency peaks are detected from a single object.

Furthermore, at step S30, the signal processing unit 15 calculates the azimuth (referred to, hereafter, as an observation point azimuth θ) of the observation point identified by a peak frequency based on, for example, phase difference information between signal components of the same peak frequency acquired from the plurality of antenna elements configuring the reception antenna 13, for each frequency peak fb detected at step S20.

Figure 8:
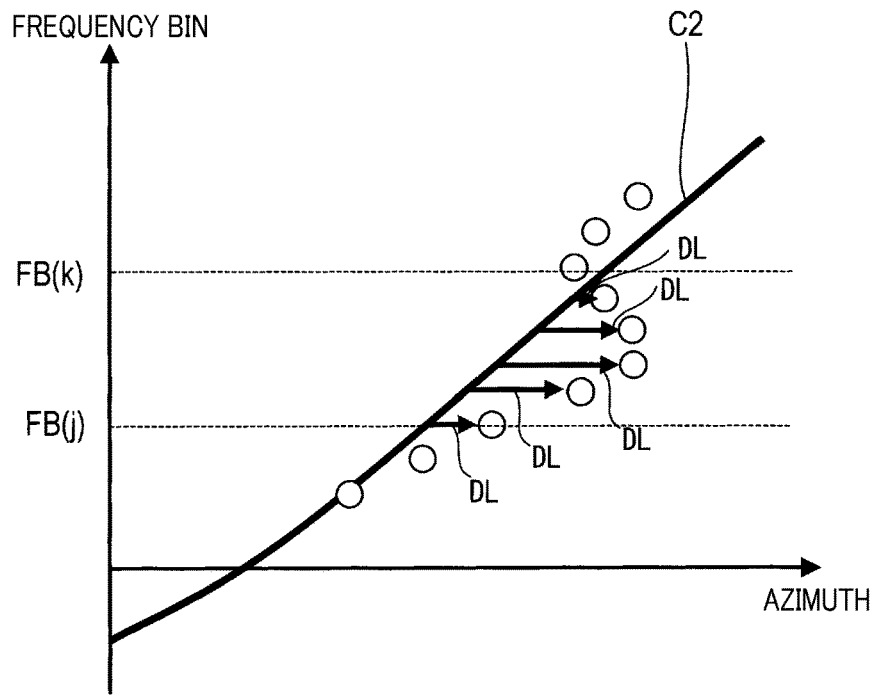
FIG. 8 is a diagram of an observation point distribution.

Then, at step S40, the signal processing unit 15 generates an observation point distribution indicating a relationship between the single or plurality of frequency peaks fb detected at step S20 and the observation point azimuth θ calculated at S30 (see FIG. 8).

Subsequently, at step S50, the signal processing unit 15 sets a bin designation value N to a determination start value j set in advance (see FIG. 8). The bin designation value N is used to designate a frequency bin. For example, when the bin designation value N is set to 10, the bin designation value N designates the frequency bin FB(10).

Then, at step S60, the signal processing unit 15 calculates a difference value DL(N) between an azimuth θ(N) and a stationary object determination value J(N) based on a following expression (7) (see FIG. 8).

$$DL(N) = \theta(N) - J(N) \quad (7)$$

Here, the azimuth θ(N) is the azimuth of the observation point corresponding to the frequency bin FB(N) on the observation point distribution generated at S40.

In addition, the stationary object determination value J(N) is an azimuth corresponding to the frequency bin FB(N) on a stationary object frequency-azimuth curve C2. The stationary object frequency-azimuth curve C2 is that in which the speed in the stationary object speed-azimuth curve C1 is converted to frequency. The stationary object frequency-azimuth curve C2 is expressed by a following expression (8). Here, frequency Fs is a frequency corresponding to the traveling speed of the own vehicle and is calculated based on the speed detected by the vehicle speed sensor 3.

$$F = Fs \cdot \sin((\theta - \varphi)) \quad (8)$$

However, at step S60, when an observation point corresponding to the frequency bin FB(N) is not present on the observation point distribution, DL(N)=0.

Next, at step S70, the signal processing unit 15 updates a sum of an integrated difference value SM and the difference value DL(N) calculated at step S60 as a new integrated difference value SM.

Then, at step S80, the signal processing unit 15 increments the bin designation value N. At step S90, the signal processing unit 15 determines whether or not the bin designation value N is greater than a determination end value k set in advance. Here, when determined that the bin designation value N is the determination end value k or less (NO at step 80), the signal processing unit 15 proceeds to step S60 and repeats the above-described processes. Meanwhile, when determined that the bin designation value N is greater than the determination end value k (YES at step S90), at step S100, the signal processing unit 15 determines whether or not the integrated difference value SM is equal to or greater than a detection determination value set in advance.

Here, when determined that the integrated difference value SM is less than the detection determination value (NO at step S100), at step S110, the signal processing unit 15 clears a detection flag Fd and proceeds to step S130. Meanwhile, when determined that the integrated difference value SM is the detection determination value or greater (YES at step S100), at step S120, the signal processing unit 15 sets the detection flag Fd and proceeds to step S130.

Upon proceeding to step S130, the signal processing unit 15 sets the integrated difference value SM to zero. At step S140, the signal processing unit 15 determines whether or not the detection flag Fd is set. Here, when determined that the detection flag Fd is set (YES at step S140), at step S150, the signal processing unit 15 determines whether or not the warning apparatus 2 is performing a notification (referred to, hereafter, as an other vehicle approach notification) indicating that a traveling vehicle is approaching from ahead of the own vehicle.

Here, when determined that the warning apparatus 2 is performing the other vehicle approach notification (YES at step S150), the signal processing unit 15 temporarily ends the traveling vehicle detection process. Meanwhile, when determined that the warning apparatus 2 is not performing the other vehicle approach notification (NO at step S150), at step S160, the signal processing unit 15 makes the warning apparatus 2 start the other vehicle approach notification and then temporarily ends the traveling vehicle detection process.

In addition, when determined at step S140 that the detection flag Fd is not set (NO at step S140), at step S170, the signal processing unit 15 determines whether or not the warning apparatus 2 is performing the other vehicle approach notification. Here, when determined that the warning apparatus 2 is not performing the other vehicle approach notification (NO at step S170), the signal processing unit 15 temporarily ends the traveling vehicle detection process. Meanwhile, when determined that the warning apparatus 2 is performing the other vehicle approach notification (YES at step S170), the signal processing unit 15 makes the warning apparatus 2 end the other vehicle approach notification and then temporarily ends the traveling vehicle detection process.

The radar apparatus 4 of the vehicle warning system 1 configured in this way is attached to the vehicle such that the direction at 90° relative to the front-rear direction of the vehicle is included in the detection range, and transmits and receives radar waves.

In addition, the signal processing unit 15 of the radar apparatus 4 detects the frequency peak of the beat signal and the observation point azimuth.

Furthermore, the radar apparatus 4 determines that a traveling vehicle is detected when, with the attachment angle that is the angle by which the center axis of the reception antenna receiving the radar waves is angled in relation to the width direction of the own vehicle as $\varphi$, the frequency peak of the beat signal as F, the observation azimuth as $\theta$, and the frequency corresponding to the traveling speed of the own vehicle as Fs, a following expression (9) is satisfied (steps S10 to S110).

$$F < Fs \cdot \sin((\theta - \varphi)) \qquad (9)$$

The radar apparatus 4 configured in this way can determine whether or not a moving object is detected based on expression (9), by detecting the frequency peak of the beat signal, the observation point azimuth, and the traveling speed of the own vehicle once. Therefore, the radar apparatus 4 is no longer required to detect the position of a detected object a plurality of times to determine whether or not the detected object is a stationary object. As a result, the radar apparatus 4 can determine whether or not the detected object is stationary in a short amount of time.

In addition, the radar apparatus 4 generates the observation point distribution indicating the relationship between the observation point azimuth $\theta$ and the frequency peak fb on the azimuth-frequency coordinate system that is a two-dimensional orthogonal coordinate system of which the observation point azimuth $\theta$ and the frequency peak fb are the variables (step S40). In addition, when the integrated difference value SM related to the difference between the position identified by the observation point azimuth $\theta$ and the frequency peak fb and the position of $Fs \cdot \sin((\theta - \varphi))$ on the azimuth-frequency coordinate system is equal to or greater than the detection determination value set in advance, the radar apparatus 4 determines that a traveling vehicle is detected (steps S50 to S120).

As a result, a traveling vehicle can be detected by a simple method in which the integrated difference value and the detection determination value are compared. Calculation processing load for detecting a traveling vehicle can be reduced.

In addition, the radar apparatus 4 detects the observation point relative speed by transmitting and receiving radar waves based on the dual-frequency CW method. In addition, the radar apparatus 4 detects a traveling vehicle by generating the observation point distribution indicating the relationship between the frequency of the beat signal (that is, the frequency peak fb) and the observation point azimuth $\theta$. A reason for this is because, in the dual-frequency CW method, a proportional relationship is established between the frequency of the generated beat signal and the observation point relative speed.

In this way, to detect a traveling vehicle, the radar apparatus 4 can use the frequency peak acquired from the power spectrum that is typically generated in the dual-frequency CW method. As a result, a process in which the observation point relative speed is calculated based on the beat signal to generate the observation point distribution can be omitted. Calculation processing load for detecting a traveling vehicle can be reduced.

In addition, in the vehicle warning system 1, when the radar apparatus 4 that has detected a traveling vehicle makes a determination, the warning apparatus 2 performs an other vehicle approach notification for the occupant of the vehicle. As a result, when a traveling vehicle is present near the own vehicle, the occupant of the vehicle can be notified of the presence.

According to the above-described embodiment, the radar apparatus 4 is an on-board radar apparatus of the present invention. The signal processing unit 15 is an observation point detecting means of the present invention. The processes at steps S10 to S120 by the signal processing unit 15 is a moving object detecting means of the present invention. The process at step S40 by the signal processing unit 15 is an observation point distribution generating means of the present invention. The warning apparatus 2 is a notification apparatus of the present invention. The vehicle warning system 1 is a notification system of the present invention.

An embodiment of the present invention is described above. However, the present invention is not limited to the above-described embodiment. Various embodiments are possible as long the embodiments belong within the technical scope of the present invention.

For example, according to the above-described embodiment, that in which the relative speed and the azimuth are detected through use of the dual-frequency CW method is described. However, the detection method is not limited thereto. For example, the relative speed and the azimuth may be detected through use of a frequency-modulated continuous-wave (FMCW) method.

In addition, according to the above-described embodiment, that in which the observation point azimuth $\theta$ and the frequency peak fb are detected, the observation point distribution indicating the relationship between the observation point azimuth $\theta$ and the frequency peak fb is generated, and a traveling vehicle is detected using expression (8) is described. However, the observation azimuth $\theta$ and the observation point relative speed may be detected, an observation point distribution indicating the relationship between the observation point azimuth $\theta$ and the observation point relative speed may be generated, and a traveling vehicle may be detected using expression (5).

In addition, according to the above-described embodiment, that in which the reception antenna 13 is attached such as to face behind the own vehicle is described. However, the present invention is also applicable to when the reception antenna 13 is attached such as to face ahead of the own vehicle.

In addition, according to the above-described embodiment, that in which a traveling vehicle is detected through use of the integrated difference value SM in which the difference value DL calculated for each of a plurality of observation points are added is described. However, for each of the plurality of difference values DL calculated for the observation points, whether or not the difference value DL is equal to or greater than a threshold set in advance may be determined. In this case, the threshold may be changed based on the observation point azimuth corresponding to the difference value DL. In general, detection error in the radar apparatus increases as the angle from the center axis of the reception antenna increases. Therefore, for example, erroneous detection of a traveling vehicle can be reduced by the threshold being increased as the observation point azimuth increases.

Figure 9:
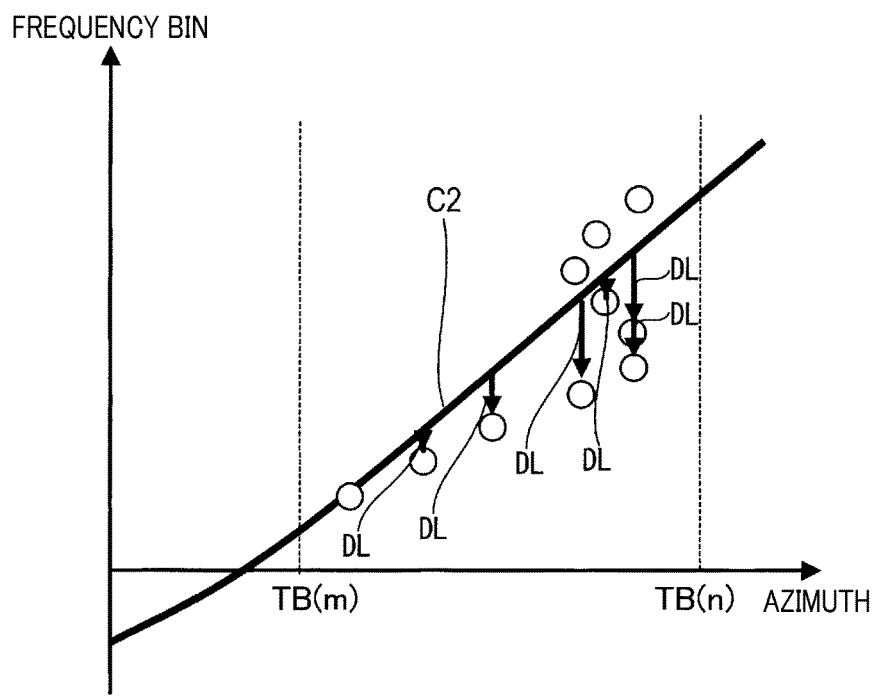
FIG. 9 is a diagram for explaining a calculation method for a difference value according to another embodiment.

In addition, according to the above-described embodiment, as the difference value DL, the difference value of the azimuth on the stationary object frequency-azimuth curve C2 is calculated for each frequency bin FB. However, as shown in FIG. 9, as the difference value DL, a difference value with the frequency on the stationary object frequency-azimuth curve C2 may be calculated for each azimuth bin TB(M). Here, M is an azimuth bin designation value.

In addition, when the difference value DL is calculated for each azimuth bin TB(M), the calculation of the difference value DL may be performed within a range of an azimuth bin TB(m) to an azimuth bin TB(n) set in advance. Here, m is a determination start value and n is a determination end value.

In addition, according to the above-described embodiment, that in which the other vehicle approach notification is performed when the integrated difference value SM is the detection determination value or greater (YES at step S100) in the traveling vehicle detection process performed at every modulation cycle Tm is described. However, a history of recent calculation results of the integrated difference value SM may be stored. When the number of times that the integrated difference value becomes equal to or greater than a threshold set in advance becomes equal to or greater than a detection determination count set in advance, a determination may be made that a traveling vehicle is detected. For example, as shown in FIG. 10, a history of the six most recent integrated difference values SM is stored. When the numbers of times that the integrated difference value SM exceeds thresholds TH1, TH2, and TH3, set in advance, respectively become equal to or greater than detection determination counts CT1, CT2, and CT3, set in advance, a determination may be made that a traveling vehicle is detected.

In addition, a function provided by a single constituent element according to the above-described embodiment may be dispersed among a plurality of constituent elements. Functions provided by a plurality of constituent elements may be integrated in a single constituent element. Furthermore, at least a part of a configuration according to the above-described embodiment may be replaced by a publicly known configuration having a similar function. In addition, at least a part of a configuration according to the above-described embodiment may be omitted. Furthermore, at least a part of a configuration according to an above-described embodiment may be added to or replace a configuration according to another above-described embodiment. All aspects included in the technical concept identified solely by the expressions recited in the claims are embodiments of the present invention.

REFERENCE SIGNS LIST

1: vehicle warning system
2: warning apparatus
4: radar apparatus
15: signal processing unit

The invention claimed is:

1. An on-board radar apparatus that is attached to a vehicle such that a direction at 90 degrees relative to a front-rear direction of the vehicle is included in a detection range, and transmits and receives radar waves, the on-board radar apparatus comprising:
   an observation point detecting means that detects an observation point relative speed that is a relative speed in relation to an observation point that has reflected the radar wave within the detection range and an observation point azimuth that is an azimuth at which the observation point is present; and
   a moving object detecting means that determines that a moving object is detected based on an expression (1) being satisfied,
   the expression (1) being expressed by $$V < V_s \cdot \sin(\theta - \varphi) \qquad (1)$$

where $\varphi$ is an attachment angle that is an angle at which a center axis of a reception antenna receiving the radar wave is angled in relation to a width direction of the vehicle, V is the observation point relative speed, θ is the observation point azimuth, and Vs is a traveling speed of the vehicle.

2. The on-board radar apparatus according to claim 1, further comprising:

an observation point distribution generating means that generates, on an azimuth-speed coordinate system that is a two-dimensional orthogonal coordinate system of which an azimuth parameter related to the observation point azimuth and a relative speed parameter relative to the observation point relative speed are variables, an observation point distribution indicating a correspondence relationship between the azimuth parameter and the relative speed parameter, wherein the moving object detecting means determines that the moving object is detected based on a difference parameter related to a difference between a position identified by the azimuth parameter and the relative speed parameter and a position on a curve identified by Vs·sin (θ-φ) on the azimuth-speed coordinate system being equal to or greater than a moving object detection determination value set in advance.

3. The on-board radar apparatus according to claim 2, wherein:

the moving object detection determination value changes based on the observation point azimuth.

4. The on-board radar apparatus according to claim 3, wherein:

the observation point detecting means detects the observation point relative speed by transmitting and receiving the radar waves by a dual-frequency continuous-wave method.

5. The on-board radar apparatus according to claim 2, wherein:

the observation point detecting means detects the observation point relative speed by transmitting and receiving the radar waves by a dual-frequency continuous-wave method.

6. The on-board radar apparatus according to claim 1, wherein:

the observation point detecting means detects the observation point relative speed by transmitting and receiving the radar waves by a dual-frequency continuous-wave method.

7. A notification system comprising:

an on-board radar apparatus that is attached to a vehicle such that a direction at 90 degrees relative to a front-rear direction of the vehicle is included in a detection range, and transmits and receives radar waves, the on-board radar apparatus comprising:

an observation point detecting means that detects an observation point relative speed that is a relative speed in relation to an observation point that has reflected the radar wave within the detection range and an observation point azimuth that is an azimuth at which the observation point is present; and a moving object detecting means that determines that a moving object is detected based on an expression (1) being satisfied, the expression (1) being expressed by $$V < Vs \cdot \sin(\theta - \varphi) \qquad (1)$$

where φ is an attachment angle that is an angle at which a center axis of a reception antenna receiving the radar wave is angled in relation to a width direction of the vehicle, V is the observation point relative speed, θ is the observation point azimuth, and Vs is a traveling speed of the vehicle; and a notification apparatus that, in response to the moving object detecting means determines that the moving object being detected, notifies an occupant of the vehicle of the determination.

8. The notification system according to claim 7, wherein:

the on-board radar apparatus further comprises:

an observation point distribution generating means that generates, on an azimuth-speed coordinate system that is a two-dimensional orthogonal coordinate system of which an azimuth parameter related to the observation point azimuth and a relative speed parameter related to the observation point relative speed are variables, an observation point distribution indicating a correspondence relationship between the azimuth parameter and the relative speed parameter; and the moving object detecting means determines that the moving object is detected based on a difference parameter related to a difference between a position identified by the azimuth parameter and the relative speed parameter and a position on a curve identified by Vs·sin (θ-φ) on the azimuth-speed coordinate system being equal to or greater than a moving object detection determination value set in advance.

9. The notification system according to claim 7, wherein:

the moving object detection determination value changes based on the observation point azimuth.

10. The notification system according to claim 7, wherein:

the observation point detecting means detects the observation point relative speed by transmitting and receiving the radar waves by a dual-frequency continuous-wave method.

11. A moving object detection method of an on-board radar apparatus that is attached to a vehicle such that a direction at 90 degrees relative to a front-rear direction of the vehicle is included in a detection range, and transmits and receives radar waves, the moving object detection method of an on-board radar apparatus characterized by:

detecting, by an observation point detecting means of the on-board radar apparatus, an observation point relative speed that is a relative speed in relation to an observation point that has reflected the radar wave within the detection range and an observation point azimuth that is an azimuth at which the observation point is present; and determining, by a moving object detecting means of the on-board radar apparatus, that a moving object is detected based on an expression (1) being satisfied, the expression (1) being expressed by $$V < Vs \cdot \sin(\theta - \varphi) \qquad (1)$$

where φ is an attachment angle that is an angle at which a center axis of a reception antenna receiving the radar wave is angled in relation to a width direction of the vehicle, V is the observation point relative speed, θ is the observation point azimuth, and Vs is a traveling speed of the vehicle.

* * * * *